United States Patent
Lopez (10) Patent No.: US 8,775,225 B2
(45) Date of Patent: Jul. 8, 2014

(54) TELECOM MANAGEMENT SERVICE SYSTEM

(75) Inventor: Claudio Marcelo Lopez, Buenos Aires (AR)

(73) Assignee: Service Bureau Intetel S.A., Buenos Aires (AR)

( * ) Notice: Subject to any disclaimer, the term of this patent is extended or adjusted under 35 U.S.C. 154(b) by 1328 days.

(21) Appl. No.: 11/836,630

(22) Filed: Aug. 9, 2007

(65) Prior Publication Data
US 2008/0046269 A1 Feb. 21, 2008

Related U.S. Application Data

(60) Provisional application No. 60/838,848, filed on Aug. 18, 2006.

(51) Int. Cl.
*G06Q 10/00* (2012.01)

(52) U.S. Cl.
USPC ............ 705/7.11; 705/304; 705/34; 705/7.25

(58) Field of Classification Search
USPC .......................................... 705/34, 304, 7.25
See application file for complete search history.

(56) References Cited

U.S. PATENT DOCUMENTS

| | | | |
|---|---|---|---|
| 6,349,238 B1 * | 2/2002 | Gabbita et al. ................ | 700/101 |
| 6,973,482 B2 * | 12/2005 | Mohammed et al. ......... | 709/208 |
| 7,054,618 B1 | 5/2006 | McCullough | |
| 7,711,573 B1 * | 5/2010 | Obeid ........................... | 705/321 |
| 2002/0123983 A1 * | 9/2002 | Riley et al. ....................... | 707/1 |
| 2002/0194047 A1 * | 12/2002 | Edinger et al. .................... | 705/9 |
| 2005/0097020 A1 | 5/2005 | Nomura et al. | |
| 2005/0203789 A1 * | 9/2005 | Kauffman et al. ................ | 705/8 |
| 2006/0053043 A1 * | 3/2006 | Clarke .............. | 705/8 |
| 2007/0136197 A1 * | 6/2007 | Morris ............................ | 705/44 |
| 2008/0052138 A1 * | 2/2008 | Marsh et al. ..................... | 705/7 |

FOREIGN PATENT DOCUMENTS

KR 200403804 1/2004

OTHER PUBLICATIONS

Search Report issued in counterpart U.K. Application No. GB0716131.8; Dec. 20, 2007; 3 pages.
Examination Report issued in counterpart UK Application No. GB0716131.8; Sep. 20, 2010; 2 pages.
Official Action issued in counterpart MX Application No. MX/a/2007/010047; Apr. 1, 2011; 8 pages.

* cited by examiner

*Primary Examiner* — Mark A Fleischer
(74) *Attorney, Agent, or Firm* — Fish & Richardson P.C.

(57) ABSTRACT

Methods and a system to provide telecommunications management services are provided. A method includes receiving a service request for change management or servicing a telecommunications equipment item, classifying the request to determine a policy associated with the request, determining customized workflows for executing the policy and servicing the request, identifying transactions required to service the request, and monitoring execution of the transactions until completion.

14 Claims, 12 Drawing Sheets

Asignet
COMMUNICATIONS DNA help ¿Dudas? Contact us at 0800-999-0643 or our on-line email address USER | mstokle@asignet.com ⌂ Home     ☒ Log out

| 🗐 INFORMATION | ☑ REQUIREMENTS | 🖐 MASTER ABM | ⚙ CONTROL DATA |

⬇ MARIANO STOKLE

The registry and history of the communications made through e-mail, the ABM messages, and the requests (consults, claims, workflows and requests) are maintained on-line for a two year period. The recording of the phone calls are maintained for a period of 3 months.

Communications and Applications

| Type | Date | Time | Type | Number | Status |
|---|---|---|---|---|---|
| 🗋 | 23/04/2007 | 15:10:00 | Remove Extension | A6355W021244 | ● |
| 🗋 | 23/04/2007 | 12:41:00 | New Extension | A6355W021228 | ○ |
| 🗋 | 18/04/2007 | 11:54:00 | Remove Extension | A6355W021028 | ● |
| 🗋 | 18/04/2007 | 11:32:00 | New Extension | A6355W021016 | ○ |
| 🗋 | 17/04/2007 | 12:48:00 | New Extension | A6355W020962 | ○ |
| 🗋 | 12/04/2007 | 11:28:00 | Change Category or Password | A6355W020597 | ● |
| 🗋 | 11/04/2007 | 21:16:00 | Change Category or Password | A6355W020565 | ● |
| 🗋 | 11/04/2007 | 21:06:00 | Modify Teclas | A6355W020564 | ● |
| 🗋 | 04/04/2007 | 11:19:00 | Remove Extension | A6355W020356 | ○ |
| 🗋 | 04/04/2007 | 11:18:00 | Remove Extension | A6355W020354 | ● |
| 🗋 | 04/04/2007 | 11:17:00 | Remove Extension | A6355W020353 | ○ |
| 🗋 | 04/04/2007 | 11:06:00 | Remove Extension | A6355W020351 | ○ |

[ Filtar ]

● Internet local          🔍 100%

| Asignet | | | | | @Home | |
|---|---|---|---|---|---|---|
| COMMUNICATIONS DNA | | USER | mstokle@asignet.com | | | ☒ Log Out |
| ☐ INFORMATION | ☑ REQUIREMENTS | ⚙ MASTER ABM | | 🎛 CONTROL DATA | | |
| ☑ Site: ASIGNET – CENTRAL | ASIGNET – CENTRAL | Period | Ult. 24 hs | ∨ | Filtro | |
| Model: Communication Server 1000M Cabinet | | | | | | |

Volver

List of Transactions 1 of 5  (01)(02)(03)(04)

| Cod.Trans. | Type of Transaction | CC01 | CC02 | CC03 | CC04 | CC05 | Status | Buffer | Start Date | End Date |
|---|---|---|---|---|---|---|---|---|---|---|
| Atrtoil | Management Print Traffic Log | 005 006 2007 | 0140000 | | | | OK | | 2/05/07 12:17:07 | 2/05/07 12:17:34 |
| Mpecae | Maint. Peripheral Equip. Cards Status | 00 | | | | | OK | | 2/05/07 11:17:07 | 2/05/07 11:18:34 |
| Mpecae | Maint. Peripheral Equip. Cards Status | 00 | | | | | OK | | 2/05/07 10:47:03 | 2/05/07 10:47:20 |
| Mpecae | Maint. Peripheral Equip. Cards Status | 00 | | | | | OK | | 2/05/07 10:17:06 | 2/05/07 10:17:33 |
| AP | New Password | 98027 | 001 | | | | OK | | 2/05/07 10:16:50 | 2/05/07 10:14:32 |
| Mpecae | Maint. Peripheral Equip. Cards Status | 00 | | | | | OK | | 2/05/07 09:47:05 | 2/05/07 09:48:38 |
| Atrtoil | Management Print Traffic Log | 002 005 2007 | 003000 | | | | OK | | 2/05/07 09:31:03 | 2/05/07 09:31:53 |
| Mpecae | Maint. Peripheral Equip. Cards Status | 00 | | | | | OK | | 2/05/07 09:06:55 | 2/05/07 10:17:38 |
| Asyhii | Management System History | %TIM000 05:00 2/5/07 CPU0 | | | | | OK | | 2/05/07 09:09:59 | 2/05/07 09:11:13 |
| Mpecae | Maint. Peripheral Equip. Cards Status | 00 | | | | | OK | | 2/05/07 08:46:58 | 2/05/07 08:47:42 |
| Mpecae | Maint. Peripheral Equip. Cards Status | 00 | | | | | OK | | 2/05/07 08:16:55 | 2/05/07 08:17:49 |
| Mpecae | Maint. Peripheral Equip. Cards Status | 00 | | | | | OK | | 2/05/07 07:46:59 | 2/05/07 07:47:22 |
| Atrtoil | Management Print History Log | 002 005 2007 | 00300 | | | | OK | | 2/05/07 07:30:58 | 2/05/07 07:31:36 |
| Mpecae | Maint. Peripheral Equip. Cards Status | 00 | | | | | OK | | 2/05/07 07:06:57 | 2/05/07 07:17:43 |
| Mpecae | Maint. Peripheral Equip. Cards Status | 00 | | | | | OK | | 2/05/07 06:46:55 | 2/05/07 06:47:34 |
| Mpecae | Maint. Peripheral Equip. Cards Status | 00 | | | | | OK | | 2/05/07 06:16:58 | 2/05/07 06:17:23 |

● Internet local                  ⛶ 100%

TELECOM MANAGEMENT SERVICE SYSTEM

RELATED APPLICATION

This application claims the benefit of U.S. Provisional Application No. 60/838,848, filed Aug. 18, 2006, which is hereby incorporated by reference in its entirety.

BACKGROUND

Traditional communication business services solutions provide customers with management of communication business services by one or a group of expert workers. The one or group of expert workers are familiar with the semantics and the syntaxes of the systems they are responsible to maintain. Problematically, the ability of the expert workers to perform depends on the quantity as well as quality of the knowledge they possess.

SUMMARY

In general methods and a system to provide telecommunications management services are described. The services provide a set of capabilities that allow handling customer support or changing requests directly from end users. The services can be configured to dispatch customized workflow processes to coordinate human or automata resources that will be used in order to fulfill customer expectation.

In one aspect, a method for processing service requests for servicing telecommunications equipment end to end in disparate systems is provided. The method includes receiving a request for service for an equipment item, classifying the request including gathering information sufficient to perform the classification, determining one or more policies for servicing the request, implementing a workflow for obtaining approvals for the request, determining one or more additional workflows for completing the request, and determining transactions associated with the one or more additional workflows. Upon receipt of approval, the method includes dispatching the transactions for execution and monitoring completion of all transactions including notifying a user of the equipment item.

Aspects of the invention can include none, one or more of the following features. Receiving a request can include receiving a request from a portal associated with a customer end user. Receiving the request can include receiving the request by way of a communication medium selected from the group comprising: a telephone call, a webform, an electronic message, or a form. Classifying the request can include determining a type of request. Classifying the request can include determining a policy associated with the type of request. Classifying the request can include determining information sufficient to identify the user of the equipment item. Classifying can include determining a profile associated with the user of the equipment item. Classifying the request can further include retrieving information from a human resources database of the customer to classify the user.

Determining one or more policies can include determining a policy based on a type of request and an identity of a user of the equipment item. Implementing a workflow for obtaining approvals for the request can include determining approval logic for the request. Determining approval logic can include determining particular approvals or partial approvals required based on information associated with an end user of the equipment item.

The method can further include retrieving from a human resources database associated with the end user the information. Determining transactions associated with the additional workflows can include determining physical transactions that need to be completed. Dispatching the transactions for execution can include providing a queue of transactions that are to be executed by an automation system. Dispatching the transactions can include downloading transactions from a queue to a automation system for execution. Monitoring completion of all transactions can include tracking performance of service providers executing transactions. Monitoring can include rating service providers based on the performance tracking, the ratings being used to select particular service providers for execution of given transactions.

In another aspect a method can be provided that includes receiving a service request for change management or servicing a telecommunications equipment item, classifying the request to determine a policy associated with the request, determining customized workflows for executing the policy and servicing the request, identifying transactions required to service the request and monitoring execution of the transactions until completion.

In another aspect a method can be provided that includes receiving a service request for change management or servicing a telecommunications equipment item, gathering information from or concerning the user of the equipment item sufficient to classify the request, classifying the request to determine a policy associated with the request, determining customized workflows for executing the policy and servicing the request, identifying transactions required to service the request, automatically executing the transactions without further interaction with the user and monitoring execution of the transactions until completion.

In another aspect a system is provided that includes a service desk operable to receive and process requests for service to telecommunications equipment items associated with a customer and a datacenter for storing policies associated with specific types of requests. The service desk is operable to gather information sufficient to classify the request and identify one or more policies of the datacenter that are associated with the request. The system includes a business process management engine operable to determine approval logic for approving a request and transactions necessary to complete the request in accordance with the classification and policy and an automation engine operable to execute transactions dispatched by the business process management engine to complete the request.

BRIEF DESCRIPTION OF THE DRAWINGS

FIG. 5 shows an example of the types of information a service desk agent gathers to define a request.

DETAILED DESCRIPTION

Figure 1:
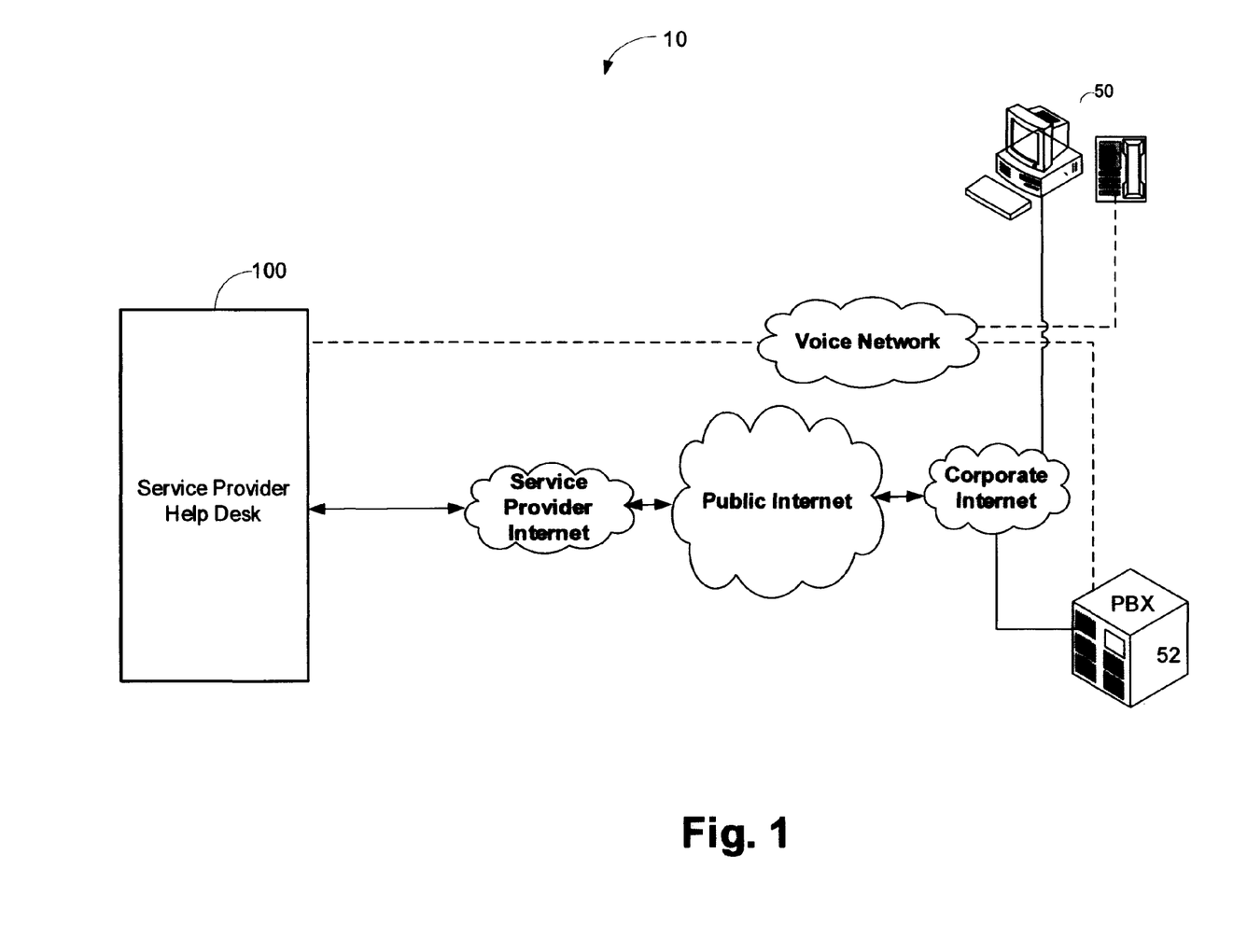
FIG. 1 is a block diagram of an example telecommunications system.

FIG. 1 is a block diagram of a telecommunications system 10 that includes various end users 50, telecommunications equipment 52 (e.g., PBX equipment) and a telecommunications management service platform 100 (hereinafter referred to as service platform 100) coupled by one or more telecommunications networks or other media 54. The service platform 100 provides direct customer support to end users to provision telecommunications equipment including servicing change requests directly from end users. The service platform 100 can be configured to dispatch customized workflow processes to coordinate human or automata resources that will be used in order to fulfill customer expectation.

Figure 2:
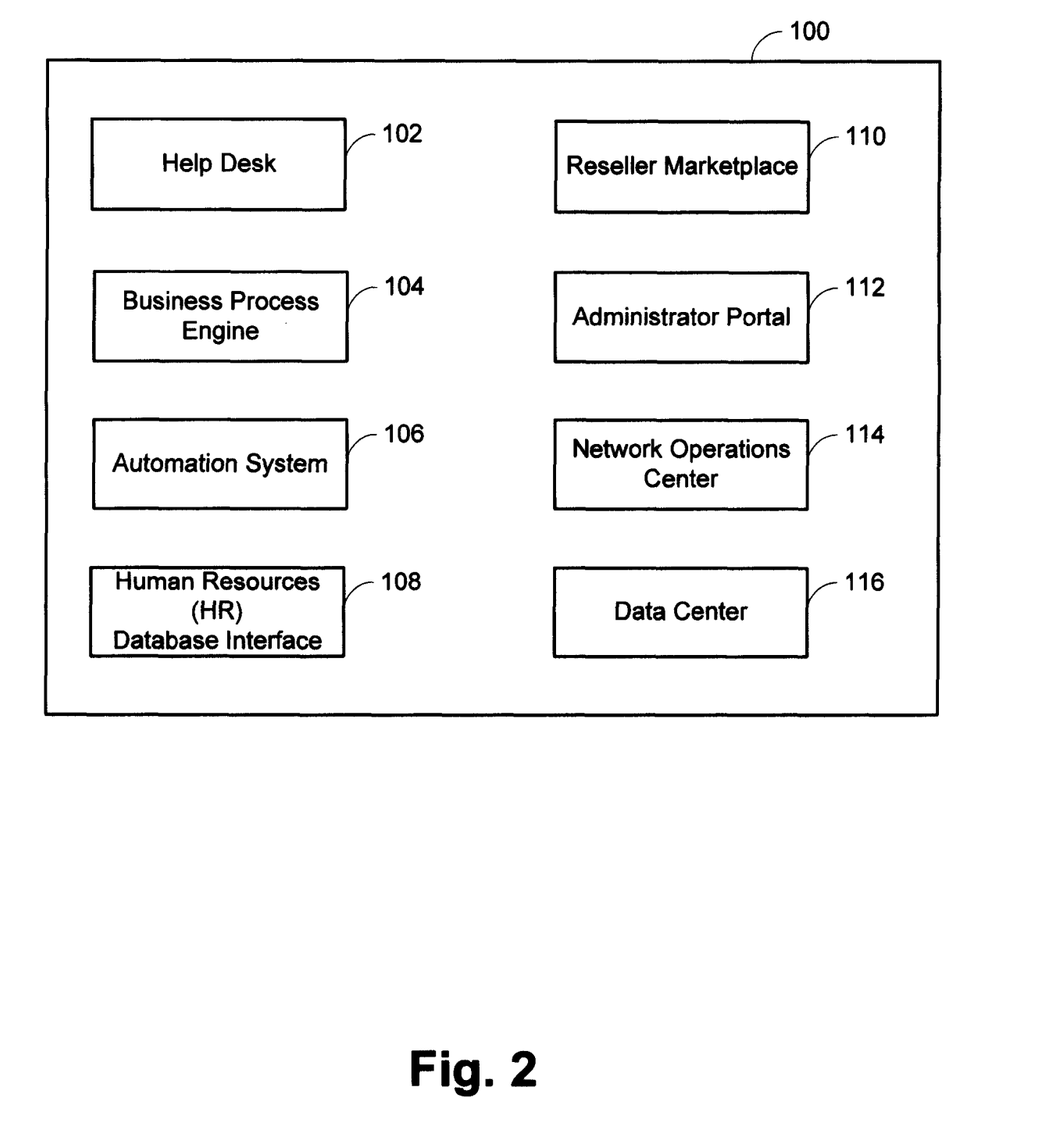
FIG. 2 is a block diagram of an example service platform.

Referring to FIG. 2, the service platform 100 includes numerous components that may be co-located or distributed. In the implementation shown, the service platform 100 includes a helpdesk 102, a business process engine 104, an automation system 106, a human resources (HR) database interface 108, a reseller marketplace 110, an administrator portal 112, a network operation center 114 and a data center 116.

Helpdesk 102 can include a portal (e.g., a single portal) that is the interface to requesting parties. In addition, helpdesk 102 can include a call center or other centralized functionality for receiving service requests. Helpdesk 102 receives requests for service (e.g., new service, change in service, help, error, etc.) from requesting parties, classifies the request and gathers information required to perform the requested classified service. Information gathering can include gathering information from the user and other databases (e.g., HR database through the HR database interface 108). Helpdesk 102 can be of the form of an ISO 9001:2000 certified service desk that receives all customer enquires, including support or change requests. In one implementation, the helpdesk 102 can handle multiple customer channels of communication including, for example, telephone, fax, e-mail, web-forms and instant messaging. Alternatively, custom helpdesk instantiations can be configured that are tailored to one or many communication channel capabilities or limitations. In one implementation, associated with the helpdesk 102 is a personal portal (not shown) that can be deployed in, for example, a customer intranet to support auto-service of common customer requests.

As described above, customer support queries are handled by the helpdesk 102. In response to a query, the helpdesk 102 services the queries using a standard set of customized processes. When a service request is received, the helpdesk 102 dispatches a process-driven workflow which proactively follows-up on the systems and people involved in the work order resolution. To facilitate follow-up, in one implementation, interactions (e.g., between the end user, other people or systems and the helpdesk 102) are tracked. Tracking can include the use of a helpdesk ticket. The helpdesk ticket associated with a given service request can be a reference for all the communication events (including phone call recording, e-mail, fax, and instant messaging logs).

Business process engine 104 allows deploying personalized workflow-based processes to be dispatched to the right resources. Associated with the business process engine 104 are one or more processes (not shown) that when executed will flow through the different actors involved in a specific task. Those actors can be end user's employees, service partner's technicians, manufacturer specific engineers, service managers, etc. The processes can be personalized, in that generic processes identified for execution can be tailored to a particular end user based on, for example, information retrieved from the HR database. Personalization of processes is discussed in greater detail below. Associated with a process can be one or more workflows that can be used to track work orders, establish approval processes, etc. The business process engine 104 receives the gathered data from the helpdesk 102 (e.g., including HR data), determines what if any approvals are required for the classified services for this individual (e.g., approval of his specific supervisor or manager), determines the transactions required for the classified services and manages their completion. Process management pieces can include notifications (e.g., provided to the end user or other actors in the system). Business process engine 104 deploys transactions which are executed by the automation engine 106 or other actors.

Part of the process management implemented in the business process engine 104 can include configuration management (resource availability), approval identification and management, work flow identification and management (to different actors, e.g., not just the hardware workflows), order tracking, and interaction definition (e.g., defining the interactions of the business process engine with the HR database). The business process engine 104 determines which processes need to be carried out, in which order, as well as the corporate policies that are appropriate.

Automation system 106 is responsible for executing automated transactions defined by workflows (as specified by business process engine 104) with both hosted and CPE (Customer Premises Equipment) and communicating with the data center 116 to receive transactions and publish the results of those transactions. Automation engine 106 receives transactions, processes them, publishes results and interacts with various components of the service platform 100 (e.g., hosted and CPE equipment). Examples of transactions and the interaction of the automation system 106 and other components in the service platform 100 are discussed in greater detail below.

Human resources database interface 108 provides an interface to one or more HR databases. Typically, the HR databases can include information relating to particular requesters (e.g., requester organization information, requester authorizations, etc.) that can be retrieved and used in one or more workflows (e.g., to customize the workflows to a particular requester) that are executed to complete a service request. For example, an employee's supervisor can be identified so that the supervisor can be polled as part of an approval process in a workflow for authorizing a service provision, change or addition.

Reseller marketplace 110 is a system to integrate service partners to the workflow process and establish specific metrics and responsibilities to each service partner. In one implementation, reseller marketplace 110 includes a selection engine (not shown) and service partner rating system (not shown). Reseller marketplace 110 can select particular service partners based on their particular expertise. Service partners can be rated (e.g., using the rating system) based on skills and capabilities. The selection engine can determine an appropriate service partner to execute a transaction based on the rating information. The ranking system can rank every company and its employees based on specific type of services they can serve (i.e., equipment commissioning, hardware replacement, on-site support, etc.). In some implementations, the reseller marketplace 110 can define and measure metrics of performance for one or more kinds of service. The rating system can be used to track service partner performance and the information can be fed back into the selection process. In one implementation, service partners (e.g., technicians and supervisors, etc.) can use the reseller marketplace (e.g., through an access portal using a login and service ticket identifier) to track their performance (i.e., evaluate service performance as against metrics). Ranking and task assignment is discussed in greater detail below in association with the workflow process.

Administrator portal 112 allows a network administrator to monitor the status of the system, perform audits, track hardware and software inventory, etc. In one implementation, the administrator portal 112 can be accessed with different levels of login (i.e., for customer, administrator, service partner, etc.)

Network operation center (NOC) 114 can, in some implementations, provide manufacturer specific (e.g., Nortel Communications for Nortel PBX devices) certified professionals that performs level 2 support services including: problem isolation; specific product defect determination; lab simulation and interoperability testing; trace and dump analysis; advanced support on all software protocols and features; complex problem reproduction in a lab environment; and remote diagnosis of problems. In some implementations, NOC 114 includes a set of tools to monitor and manage CPE equipment, including a set of automated daily processes to timely detect problems or security risks within the managed systems. The helpdesk 102 can be used to invoke particular support services based on initial information gathered from the requester (e.g., type of problem, type of equipment, etc.). NOC 114 facilitates problem recognition, after which time, the business process engine 104 can be used to execute particular workflows to resolve a given problem.

Data center 116 can be used to store all the information regarding the given system to be managed including both the hardware and the software configuration. The business process engine 104 can interact with the data center 116 to offer a particular requester different personalization options (e.g., which extension numbers are free, dialing categories available, programming templates, among other system programming details (pick-up groups, ACD groups, trunk groups, etc.)).

Figure 3:
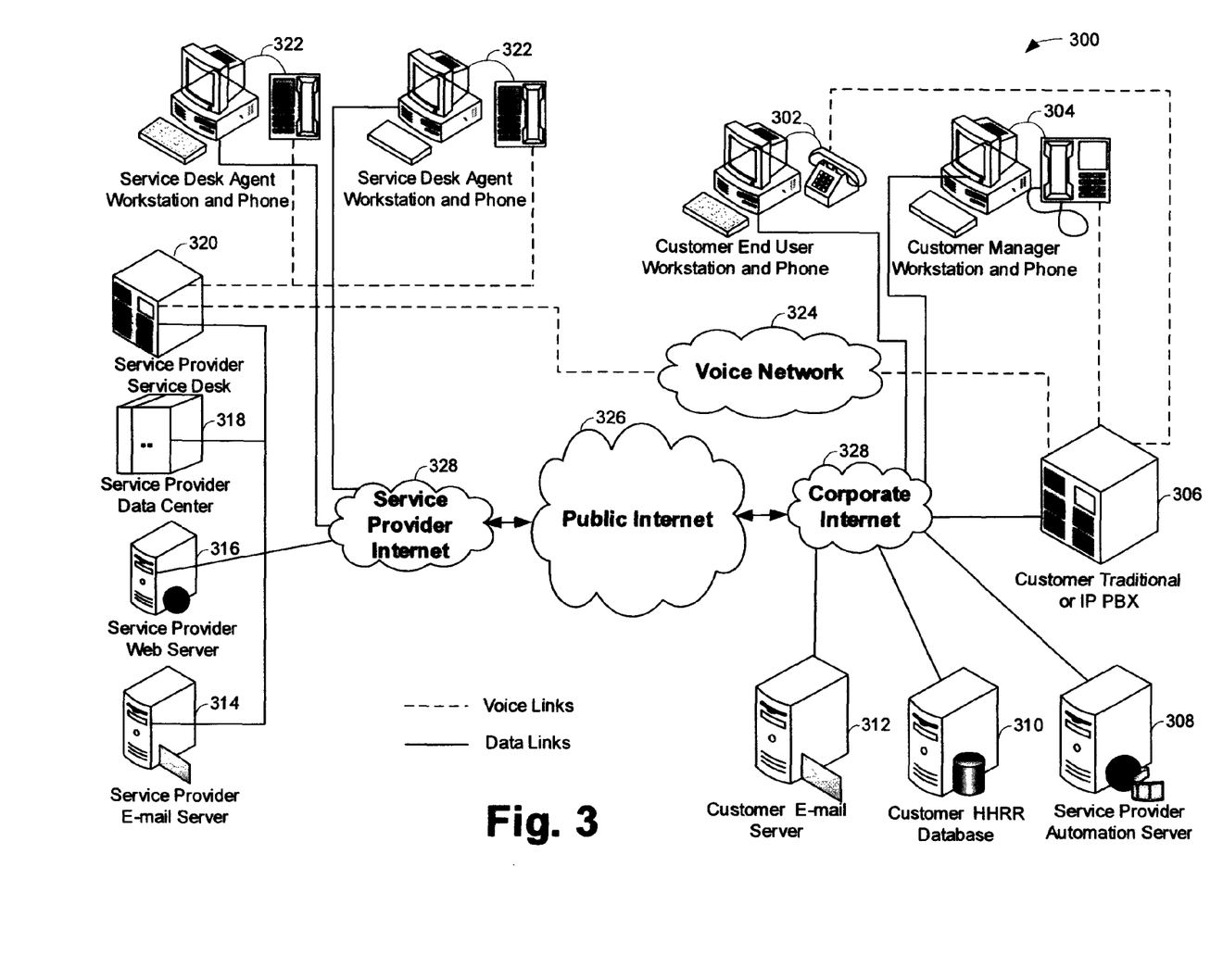
FIG. 3 is a block diagram of one implementation of the service platform of FIG. 2.

Referring now to FIG. 3, a specific implementation of a process-based management platform 300 is shown. Process-based management platform 300 includes a customer portion and a service portion. The customer portion includes one or more customer end users (e.g., including customer end user workstation and telephone) 302, a customer manager 304, customer telecommunications equipment (e.g., traditional or internet protocol PBX) 306, customer HR database 310, and a customer email server 312. Associated with the customer portion is a service provider automation server 308, which can be co-located with the various customer equipment. The service portion includes the aforementioned service provider automation server 308, a service provider interface (e.g., including service provider email server 314, and service provider web server 316), service provider data center 318, service provider service desk 320 and one or more service desk agents 322 (including, e.g., service desk workstation and telephone). The customer portion and service provider portion can be coupled by one or more networks including a voice network 324, public (e.g., the internet) 326 and private networks (corporate local area network) 328.

As discussed above, the service provider service desk 318 provides a single point of contact with the final user (e.g., customer end user 302) for all his management needs, using, to this effect, different communications media, including telephone, e-mail, web portal, IVR, among others. This single entrance point allows the processed-based business management platform to centralize the user's requirements and to provide him constant information regarding the status of his applications.

A business process engine (not shown) provides the business logic for each of the services provided to the users. The direction that processes must follow from beginning to end—including the steps for approval and the transactions required in order to complete the operation—are defined here.

The service provider automation system 308 is an application that handles the programming transactions of the different systems. In the example shown, from within the corporate Intranet, the automation system 308 can be connected to the business process engine (which can be remotely located), in order to know if there are any pending transactions. The automation system 308 can carry out the transactions using connectors to the various customer components. The service provider automation system 308 also provides a monitor function so as to detect whatever happens within the customer system in order to trigger automatic actions. In one implementation, all the information collected from the customer systems (including from the human resources data base 310) can be transmitted to the service provider system components (e.g., the service provider services desk 320) by the automation system 308 according to rules that can be personalized.

Service Desk

Figure 4:
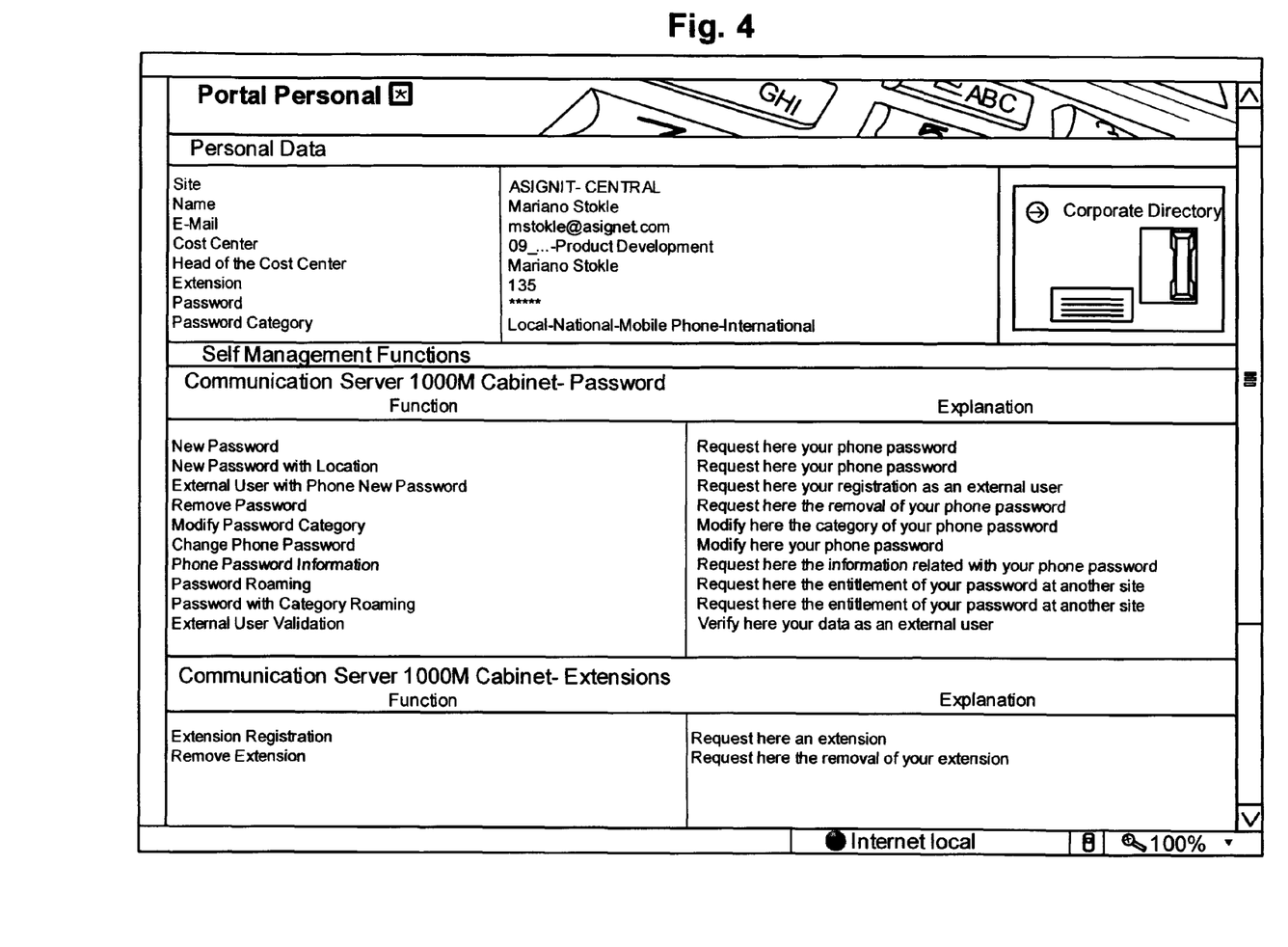
FIG. 4 shows a user interface of an example service portal an end user can use to launch a service request.

Service provider service desk 320 (hereinafter service desk 320), as mentioned before, provides a single point of contact with the final user for all his management needs. In one implementation, the service desk 320 provides the same functionality, regardless of the communications media chosen by the end user (i.e., in communicating a service request to the service provider). In one implementation, the fundamental functions provided by the service desk 320 include: user authentication; request classification; data collection; and follow up, and status information Depending of the communications media used by the requesting party and the security policy defined by the customer, the service desk 320 will authenticate the user. For example requests from within the corporate network that are received electronically may require a lesser level of authentication than telephone requests from, for example, a remote user. The authentication can be performed by biometric methods, shared secret, questionnaire of personal information, trusted relationship with other authentication systems, etc. Once the user has been authenticated, as required, the user can launch a service request. The service request can be initiated using one of a plurality of communication media. In one implementation, the service request can be launched using a personal service portal as shown in FIG. 4.

One of the main tasks of service desk 320 is to interpret and classify the user service requirement and decide which of the business processes (if any is required) must be launched. When sufficient information has been gathered to classify a request, one or more business processes can be launched. Launching the right process can be accomplished by diverse means and can be related to the media been used in a particular transaction. In some implementations, methods for launching business transactions can include: selecting by the service desk agent 322 an option (e.g., selecting an option presented as part of a customer relationship management (CRM) application executed on a workstation used by the service desk agent); clicking a link at the service portal by the end user; choosing (using voice recognition or multi-frequency tones) an option within an voice recognition (e.g., IVR) menu by the end user; or sending a text command through an instant message session by the end user.

Once the type of requirement is identified (e.g., classified) and the right business process is launched, the service desk 320 assists the end user to gather all the necessary information to complete the process. Each request can require a series of information strictly related to the type of request and that information is defined at a service semantic of the business process engine. Similar to the request classification step, the way input data is received into the system can be directly related to the media chosen by the end user to fulfill the service request. FIG. 5 shows a user interface presented to a service agent for gathering information from a user once a given request has been classified. In addition or alternatively, input data can be retrieved in one or more of the following ways by the service desk 320: by answering questions of a service desk agent who will type the data into the system; by answering questions to a voice recognition system which will interpret the information and send to the information to the system by using a well known application program interface; by typing the information directly to a web form; by typing the information into an instant messaging session which will be captured by an automata or a service desk agent.

Figure 6:
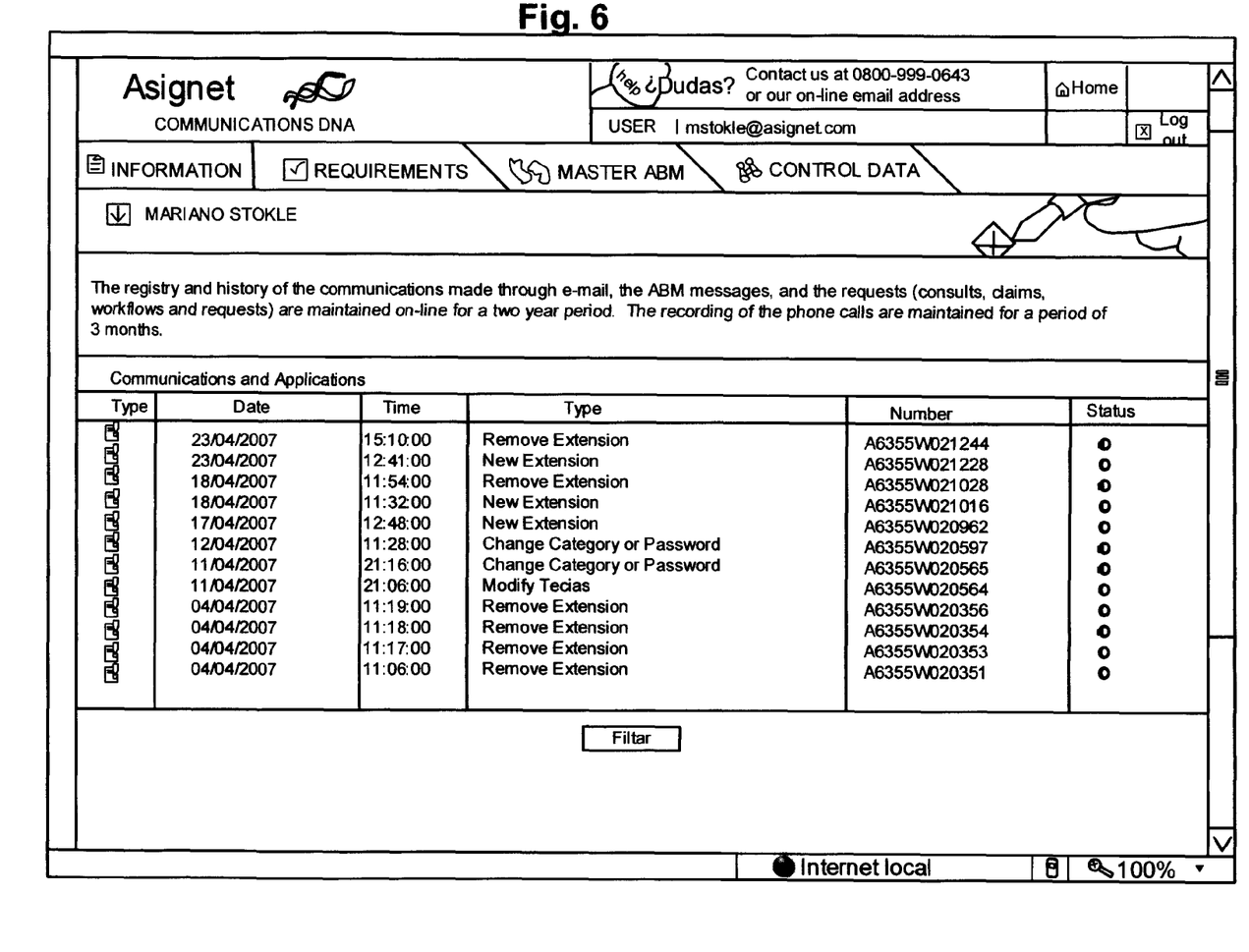
FIG. 6 and example user interface that allows a user to follow up the status of his/her requests.

One additional service provided by the service desk 320 is a follow up and status service. The information can be provided by a human agent or a system, and the type and/or delivery of information can also depend on the media chosen by the end user. Some of the ways the user can access or be provided the information are: a service desk agent provides the following-on steps of a new request or the status of a pending request; a text to speech system which provides the following-on steps of a new request or the status of a pending request; a web interface which contains the following-on steps of a new request or the status of a pending request; an incoming text message within an instant message session can include the following-on steps of a new request or the status of a pending request. An example of an web interface that provides status/follow-on information is shown in FIG. 6.

The Business Process Management Engine

The business process management (BPM) engine can be co-located with service provider data center 318, the service desk 320 or the automation system 308, distributed or otherwise configured. The business process management engine allows not only customizing the service logic for each customer, but allows defining approval processes for different types of requests. In one implementation, the functions performed by the BPM engine include: service logic definition, system database functions, approval process enforcement, transaction queuing and logistics coordination.

Figure 7:
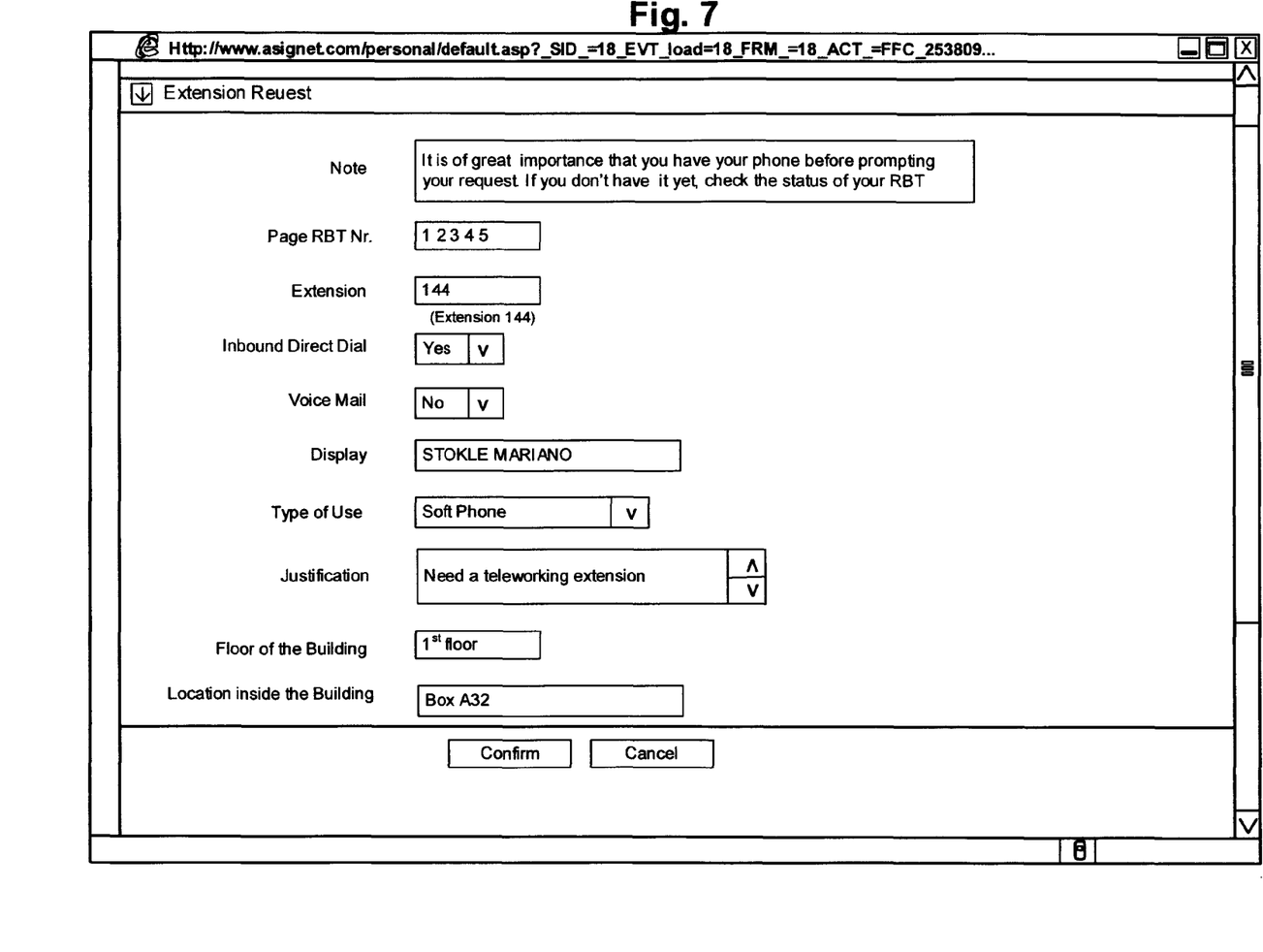
FIG. 7 shows an example of a customized workflow

At the service logic definition layer, the BPM engine aids to define which services are exposed, which users can access them and with which level of personalization they will be provided. The service logic definition layer also allows defining events that can automatically launch service processes (i.e., a new employee in the HR database, a timer can launch a back-up transaction, etc.). In one implementation, the services are exposed to the users through the different service desk media channels (call center, web portal, IVR, etc.). Depending on the role of the user (job function, hierarchical level, etc.) the services exposed might have some restrictions or not been accessible at all (i.e., manufacturing employees can have a phone password but cannot ask for a dedicated extension; managers can choose the phone model when ask a new extension but administrative users not, etc.). In one implementation, each customer can choose which services (or combination of services) it wants to offer to the users. A list of possible services that can be offered, among others, are: new extension, change of station model, change of extension number, assignment of an external line, key programming, change of display name, voice mail management, change of forwarded calls, telephone password management, change of dial restriction category, booking a scheduled conference, assignment to pickup group, and assignment to hunt group. In one implementation, a user interface in a personal portal can be used to offer service options to a given user. The user interface shown in FIG. 7 shows a particular service process that is being offered to a end user based on the user profile (e.g., a manager being allowed to choose a phone model) and a particular type of service request (e.g., a new employee request).

The BPM engine uses a system database (e.g., service provider data center 318 to store all the information regarding the system to be managed, including both the hardware and software configuration. Using this database, service logic associated with the BPM engine can offer to the user different personalization options, like which extension numbers are free to choose or the dialing categories available, programming templates, among other system programming details (pick-up groups, ACD groups, trunk groups, etc.)

Figure 8:
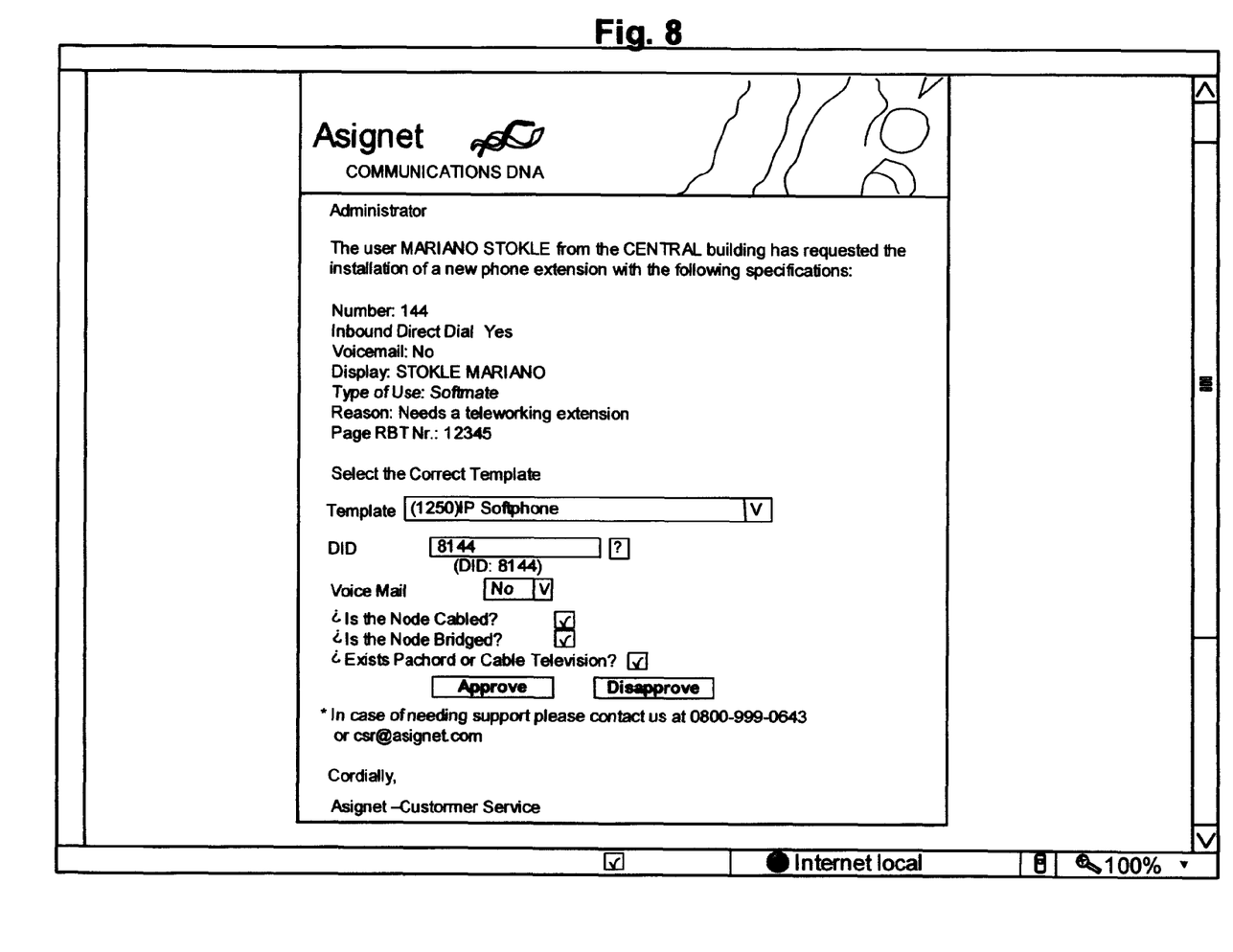
FIG. 8 shows a user interface for an approval of a particular service request.

In one implementation, the BPM engine provides approval enforcement, e.g., by dispatching approval web forms to the actors involved in the approval process (if required by the service definition). The approval forms can be transported by e-mail messages and can have options for approvers to make partial approvals. FIG. 8 shows an example of an approval form that has been sent to an actor for approval of a particular service or portion of a service request. The approval logic can be customized for each service process (no-approval need, approval by the manager, fix approval, multiple approval, etc.).

Figure 9:
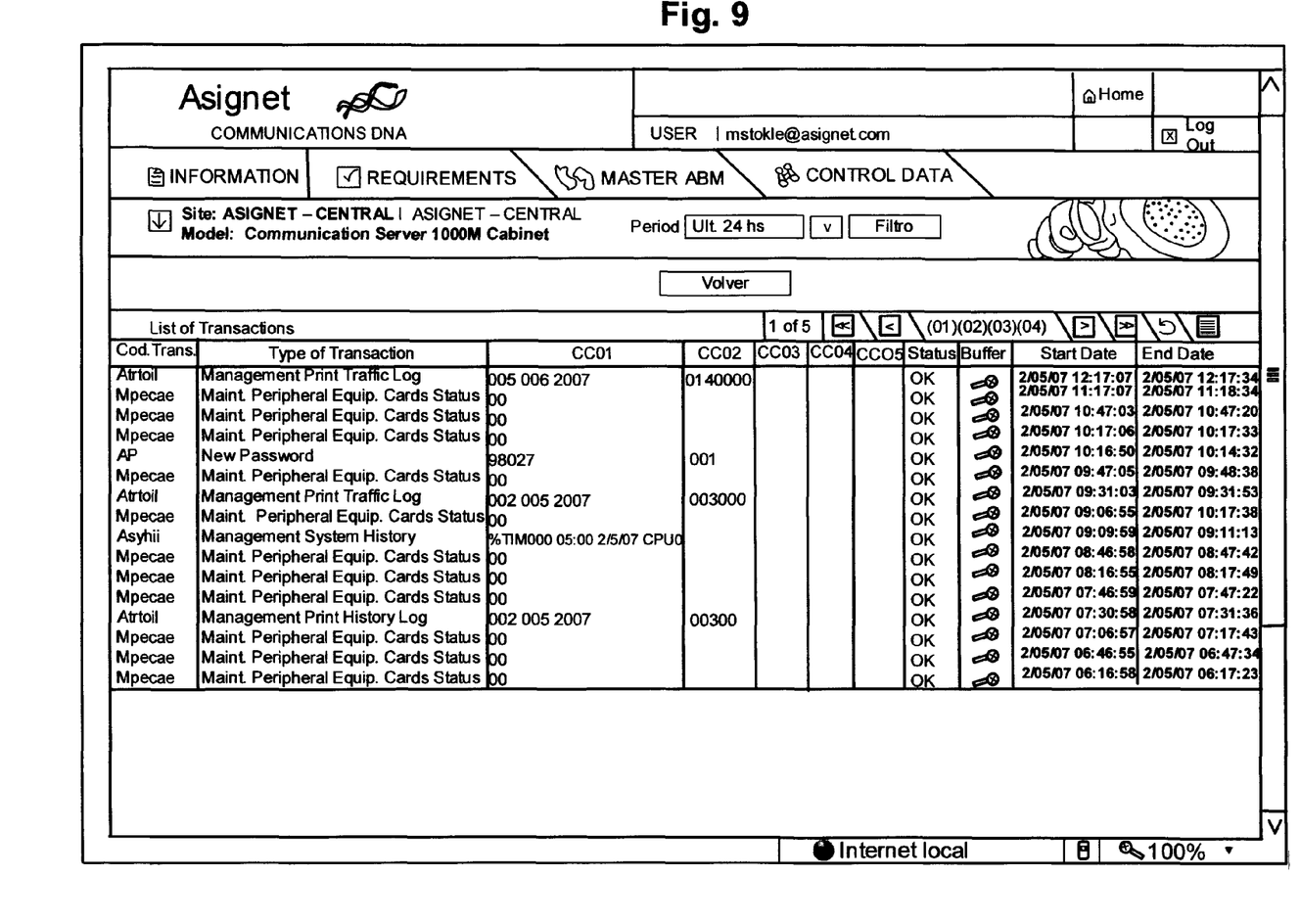
FIG. 9 shows an example queue of pending transactions.

Once the user has completed the service request (e.g., completed a web form, provided the information to an agent, etc.) and it has been approved as necessary, the BPM engine will queue the necessary transaction or group of transactions to perform the management tasks in the system or in the multiple systems involved in the service. At this layer, the BPM engine is not required to know about the actual implementation steps that are required to complete a transaction, rather, the BPM engine only defines which transaction (or group of transactions) to perform, which parameters must be used, and which system (e.g., the automation system or a partner associated with a reseller market) must perform the action. The transactions are queued in a database that can be accessed by the automation system 308 (e.g., remotely). The status of the queue can be reviewed by an administrator. An example of an interface presented by the BPM engine that shows queued transactions is shown in FIG. 9.

Figure 10:
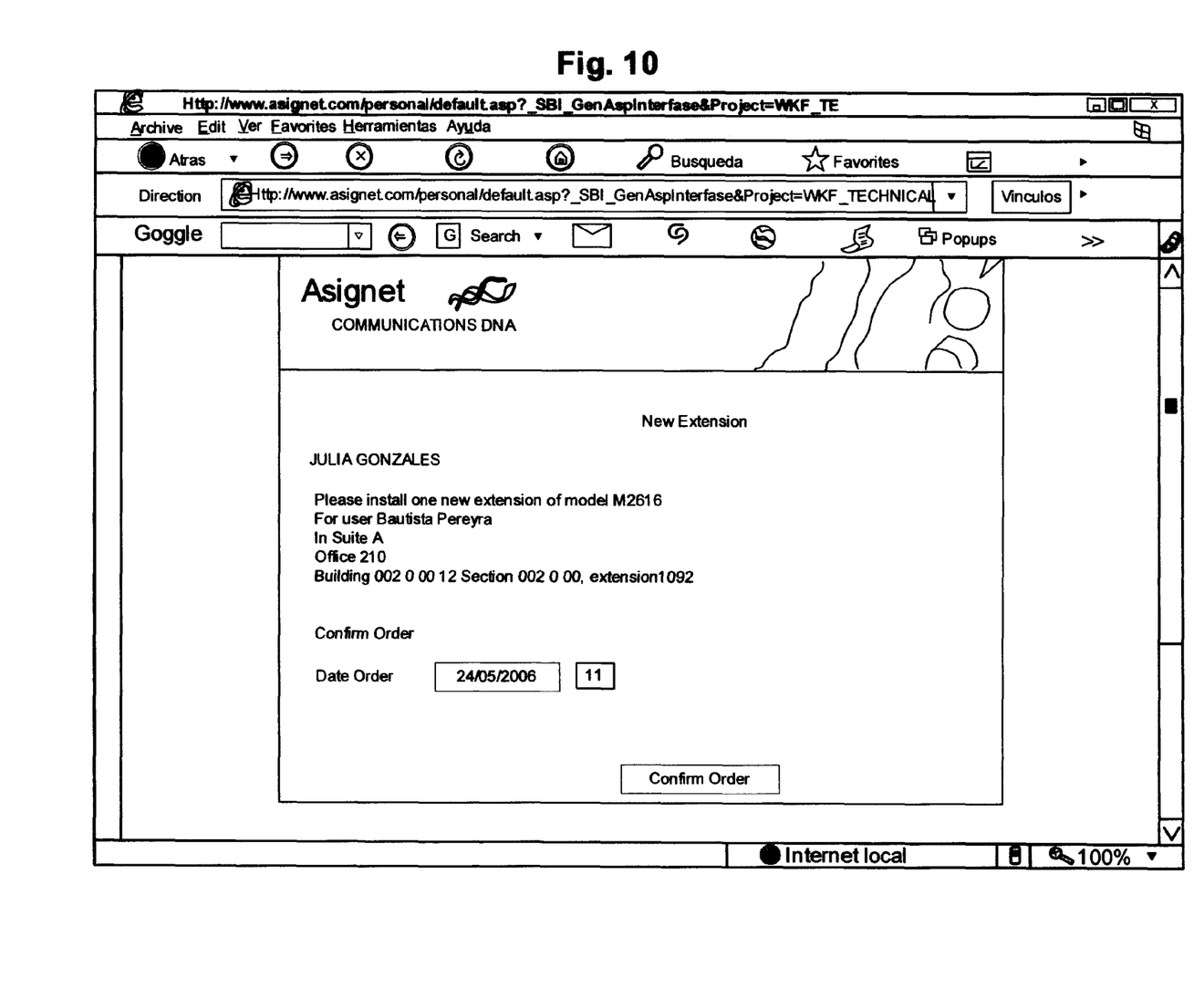
FIG. 10 shows an example order generated from the business process engine for executing a particular customized service request.

In certain services, in addition to the system programming, there are on-site tasks that must be performed in order to complete the service request. Those on-site tasks can be performed by full time employees or third party human resources. Regardless if they are internal or external resources, the BPM engine allows defining the logistic circuit at the service level and coordinating through workflows the tasks involved for that service. The logistic circuit can be from very simple (someone has to plug-in a phone in a network socket) to very complex (different companies performing different tasks with end user date coordination). The BPM engine identifies which workflows are required for a given service request, and dispatches the workflows, or portions thereof, to the actors similar to the approval workflows, using e.g., web forms and e-mails. The forms contain the information needed by the worker to perform the requested task. An example of a dispatched workflow that includes particular information for executing a given task (e.g., task type, and relevant information) is shown in FIG. 10.

The Automation System

In one implementation, the automation system is an application residing at customer's corporate intranet that is in charge of implementing the transactions in the systems to be managed. In the particular implementation shown in FIG. 3, the automation system is of the form of service provider automation server 308. In one implementation, the following tasks are performed by the automation system: downloading pending transactions; translation to the syntaxes of the target system, connecting to the customer system(s); reporting the results (e.g., to the BPM engine); and capturing system events.

In one implementation, the automation system connects to the central data center (e.g., service provider data center 318) using web services technology. Using this interface, automation system downloads one or more (e.g., all) the pending transactions (with all the parameters) for the systems attended by it. In one implementation, using the same interface, the automation system can also download maintenance transactions to be executed by it (download new features, restart the application, add a new system, update system parameters, etc.).

The automation system is configured to download the name of the transaction to be performed with its parameters which may need to be translated to the specific syntaxes of the system to be managed. In one implementation, the automation system can be used to choose the proprietary sets of commands to be performed in that system in order to achieve the desired result.

Once the sets of commands are defined, the automation system connects with a given target system (e.g., the customer PBX 306) using the interface available. In one implementation, the automation system can include multiple types of interfaces (i.e., because different systems may provide different interface technologies to be managed). In one implementation, the automation system can interface with multiple systems from multiple vendors at the same time. In one implementation, the automation system includes the following interfaces: Telnet/SSH, HTTP/HTTPS, SOAP, SNMP, CIM-XML, and terminal emulation over serial ports.

Once the transactions are executed, the automation system reports the result of those transactions to the central data center (e.g., service provider data center 318) for further processing. Some transactions will report only the result of the transaction (OK/Error) but some others will report information that is needed to be parsed and incorporated into the one or more system databases. In one implementation, the automation system reports the results using web services technology.

In one implementations, using the same interfaces described above, the automation system can be configured to capture one or more customer system events (alarms, system messages, real-time records, performance reports, etc.) that can be uploaded to the service provider system using, for example, web services technology. Events can also trigger launch of other actions like automated tasks, workflows or user notification.

Business Processes

In one implementation, numerous different types of business processes can be invoked by the service desk 320. Which ones depend on a classification of the type of request that has been received. In one implementation, requests are classified to be of 2 major types: change management requests and incident management requests.

Once the service desk 320 (e.g., through a service agent or the personal portal) takes the customer request for a MAC (move, add and change), a workflow will be dispatched. The service desk 320 inserts a transaction in the data center 318 transaction queue. If the request requires additional steps like installation services, the workflow will follow to the next step contacting the designated service partner for the customer according to the policy defined by the service provider.

When a request for the user is concerned with service problems (e.g., derived after a check has detected the problem is not due, for example, due to network connectivity), the service desk agent 322 can follow a script to gather additional information and one or more automated transactions can be dispatched to profile the request. If the request cannot be closed by this single intervention, the agent can escalate through a workflow process to, for example, NOC resources for further analysis. In one implementation, in any case requiring escalation, the BPM engine will follow up with the designated resource until the request is closed, using for example an escalation pattern according to the request qualification and the procedures established for this kind of request. In one implementation, the same business process can be dispatched from a personal portal by the end user.

In the case of a malfunction of the equipment, the service desk 320 dispatches a workflow to the NOC resources, which will include all the information collected by the service desk 320 and will be responsible to close the request. The workflow (e.g., the BPM engine) follows up until the request is closed, using for example an escalation pattern according to the request qualification and the procedures established for this kind of request.

When a new customer is added, a workflow process can be launched to create a customer profile, define the services sold, dispatching the manual work order to service engineering for provisioning and launching/batching processes for initial provisioning. Once all the provisioning tasks are identified, the BPM engine or automation system coordinates the installation services with the customer and the service partner. Once the service partner provides information indicating a successful installation, the BPM engine automatically creates the acceptance documentation that may be required to be signed by the customer to close out the request.

The automation system 308 can be used to capture on-line alarms using, for example a SNMP protocol. In one implementation, alarms are received by the NOC, but a set of critical alarms are dispatched as soon as are received with a workflow to the NOC personnel and may include time constraints to be cleared in a predetermined amount of time. Additionally, in one implementation, a set of audit process can be run, e.g., daily, at every system to audit the right functioning of each system and to detect suspicious programming or security risks. In case of detection of any deviation of the results of these audits, the automation system 308 can fire a workflow to the NOC for immediate action.

Figure 11:
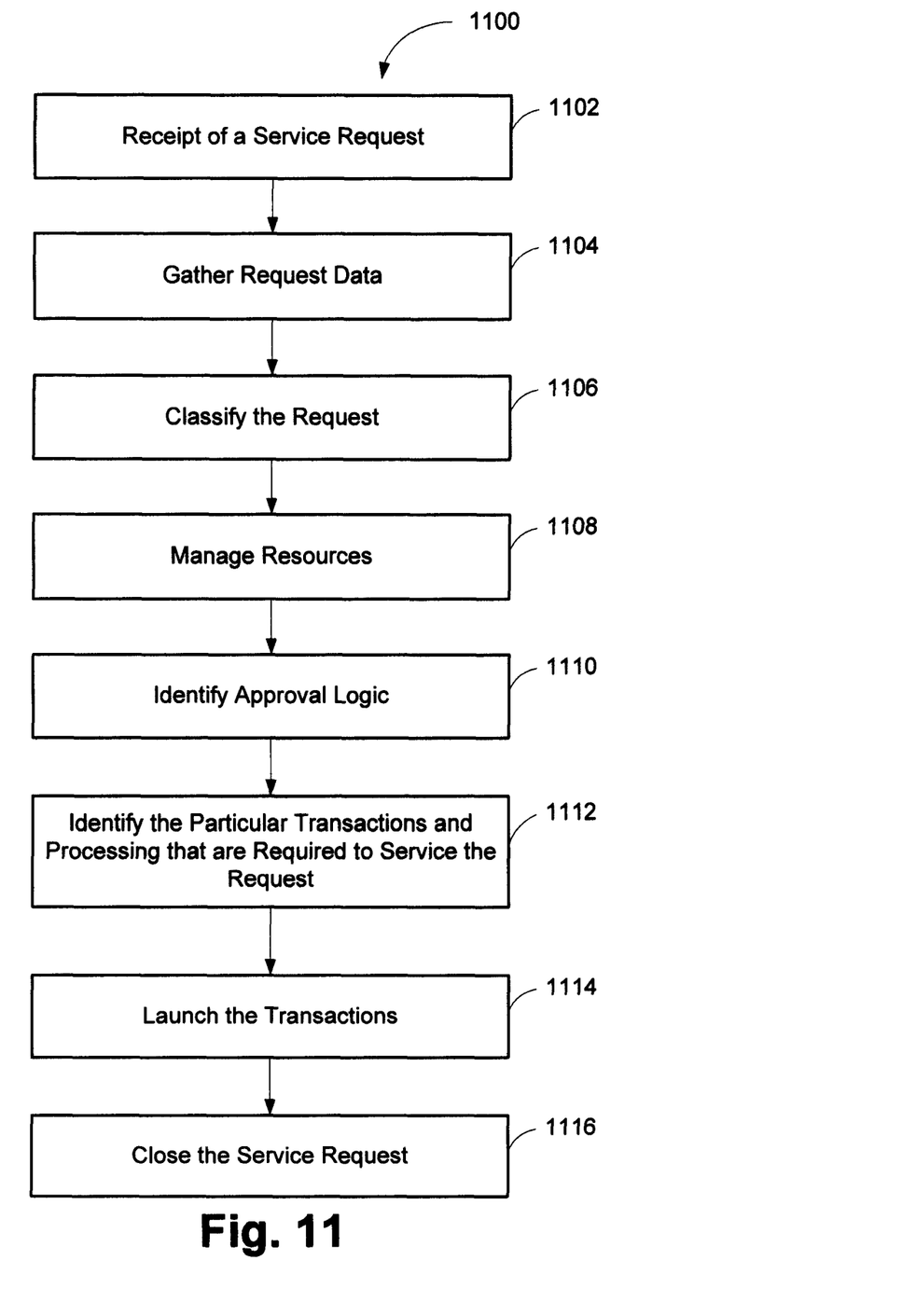
FIG. 11 shows an example method for servicing a request.

Referring now to FIG. 11, an example method 1100 for processing service requests is shown. The process begins with the receipt of a service request 1102. For example a help desk portal 102 of FIG. 2 or service provider service desk 320 of FIG. 3 associated with a service platform can receive a request for service from a end user to add a service (e.g., add long distance calling capabilities).

In an initial step, the request data is gathered 1104 and the request is classified 1106. Classification can include classifying the request as being of a particular type. Associated with the type can be one or more policies. Classification can include both the identification of an associated policy and enforcement thereof (e.g., denial of service as not authorized). After the request is classified, resources are managed 1108. For example, the service desk can determine available resources, obtain resource as necessary, or reserve resources, etc. In stage 1110, approval logic (as required by the request type or policy determination) is identified. Approval logic can be determined using information gathered as part of the initial request input (e.g., determining who the requester is based on, for example, input from the HR database).

The particular transactions and processing that are required to service the request are identified in stage 1112. Associated therewith, additional information may be required to be gathered including the necessary approvals. For example, the BPM engine can determine which transactions need to be completed to fulfill a given request. The transactions can be loaded to a queue in a data center (e.g., data center 318) associated with the service provider. Thereafter, the transactions can be downloaded to an automation system (e.g., service provider automation system 308) at the customer facility. The BPM engine can track transactions to completion, waiting for results to be published from the automation system or other system components.

Launching of the transactions is provided in stage 1114. For example, the automation system 308 can launch transactions downloaded from the data center 318 and track results. Stage 1114 can include execution and completion of transactions, coordination and follow up of complementary tasks that include physical tasks (e.g., provide and provision equipment). Finally, upon all transactions completing, the service request can be closed in stage 1116. Closing the service request can include notification to the requesting user or others.

Figure 12:
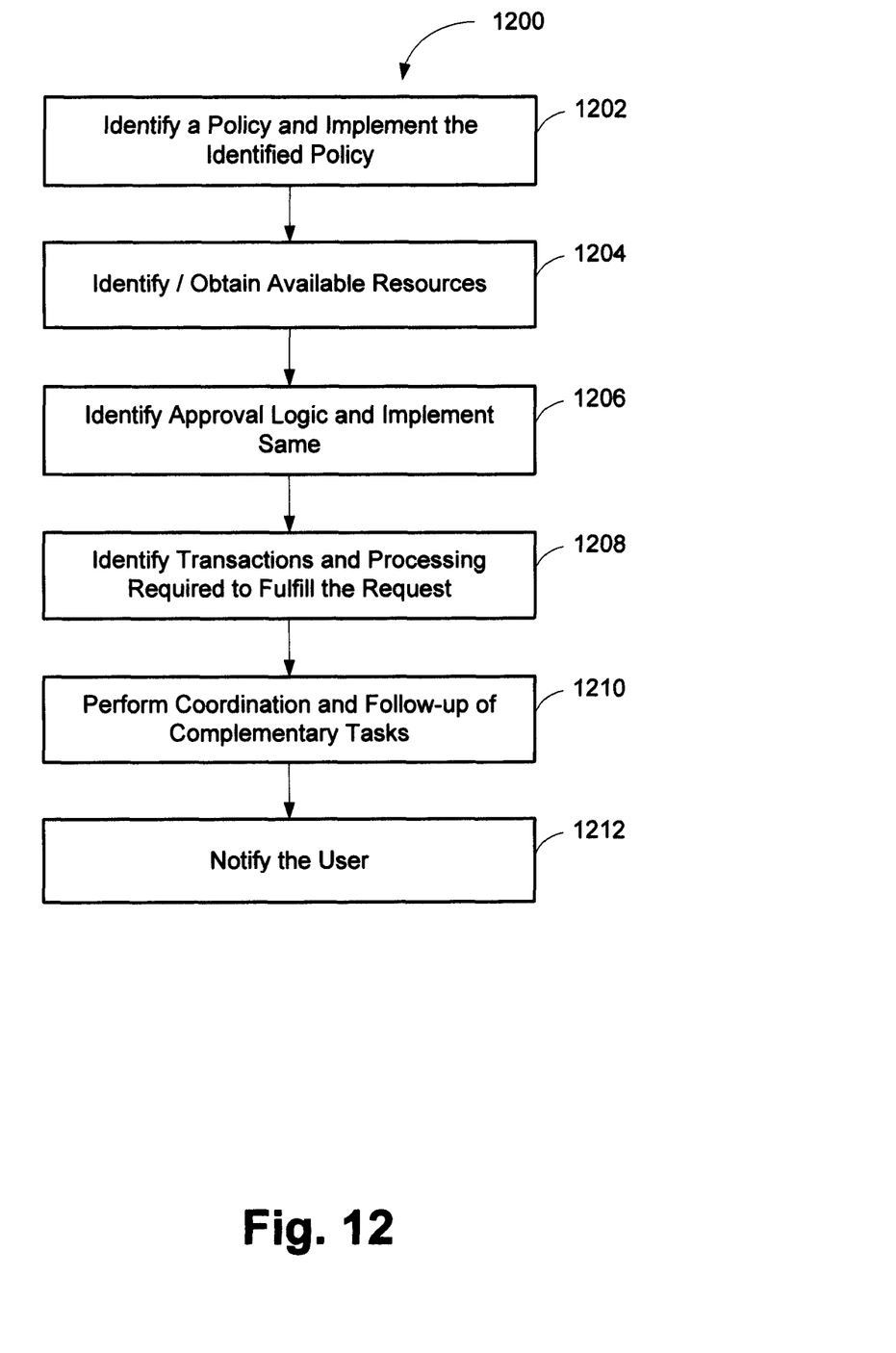
FIG. 12 shows an example method for identifying and processing requests in accordance with a policy.

Referring now to FIG. 12, an example method for servicing a specific request (e.g., a extension authorization request) is shown.

In stage 1202, a policy is identified and implemented for the user/requestor. The policy can be identified based on the classification of the type of request, the identity of the user/requestor, etc. Before any transaction is attempted, the method must clearly identify and implement one or more policies corresponding to the request (e.g., here an extension authorization) for the profile of the user who has submitted his/her application. This policy for a given type of request can vary in each customer company. In one implementation, a policy for a extension authorization answers certain basic questions: Who may apply for an authorization of extension? Can the user choose the model of his piece of equipment, or does it depend on his/her user's profile? What numeration can be assigned to the user? Can the user choose the programming chart of his extension? Can the user request an incoming direct dialing line? Once these questions are answered (e.g., as part of an information gathering phase), the information can be passed on to the business logic (BPM engine) so that the user can provide the necessary information and the system can automatically decide the rest. A typical example would be that the user chooses among a chart list of different extension models according to his/her own profile, he can then personalize the name of his extension and choose his own extension number. FIG. 13 shows a user interface for an example policy profile that is provided to a user to provide information sufficient to determine whether the requested action should be completed.

In stage 1204, available resources are obtained/identified and stored as required. In one implementation, before carrying out any transaction, the method needs to know what kind of extensions he can offer the user (in the case that he/she can choose them) or whether there are resources in existence for the model of extension defined by the policy. In this example, resources refer to ports, licenses, pieces of equipment, available numbers, cabling, and any other element which is required in order to carry out the process. The objective here is, on the one hand, to avoid accepting an application from the user if there is a lack of resources which will delay the process, and on the other, to obtain all the necessary information so that the automatic transactions will be carried through with precision and rapidity.

In stage 1206 approval logic is identified and implemented. The approval logic can be based on the identity of the user and the type of request. Once the necessary information is obtained (e.g., policy information about what approvals are required and specific personal information about which particular people need to provide the approvals using the HR database) the method can initiate approval process, by for example workflows, which follow the approval logic for the user's kind of application and profile. Workflows are used in such a way that the application goes directly towards the user and there are no unnecessary delays due to the ignorance of pending approvals.

In stage 1208, transactions and processing required to fulfill the request are identified. Once all the necessary information is obtained and all approvals are completed, the method glues the automatic transactions belonging to the system/s with which the extension management is to be produced (for example, communications server, voice mail, collaboration server, etc.). The service is not considered to be finished until all the transactions are successfully completed. In one implementation, if after several tries the transactions cannot be successfully completed, the system can refer the request to a support group that can analyze the problem, find a solution to it and restart any transactions as required.

In stage 1210, the coordination and follow-up of complementary tasks is performed. In the case of extension management, the process does not end with the transactions that need to be programmed within the systems, but several physical tasks need to be carried out in situ, such as establishing connectivity between the communications system and the user's desk, providing the telephone terminal, etc. According to the particular customer company, these tasks can be carried out by the company's personnel, by personnel from outside the company, or by a combination of both. The method coordinates the tasks with the identified personnel for the user's site according to the task that must be carried out, thus permitting the method to know the progress of the works and including when the request can be considered to be closed.

Finally, in stage 1212, the user is notified of the completion of the servicing of the request. In one implementation, every user is aware of the status of his/her application and he/she is further notified of each change in it. This can include: approvals, programming and installation of his/her extension. For example, when the method coordinates the installation work, the user is notified regarding the date and time in which the work will be carried out. Similarly, when the work is finished, the user is also notified so that he/she can give his approval to the finalization of the task.

A number of embodiments have been described. Nevertheless, it will be understood that various modifications may be made without departing from the spirit and scope of the invention. For example, an AP and client can exchange configuration request packets and configuration packets over a physical connection link to process set-up and update information. Accordingly, other embodiments are within the scope of the following claims.

The invention claimed is:

1. A computer-implemented method for processing service requests for servicing telecommunications equipment in an enterprise performed by at least one processor, the method comprising the following operations:

receiving, by an enterprise computing system in an enterprise network, a request to activate a telecommunication service for an equipment item in the enterprise network, wherein the equipment item is assigned to an employee of the enterprise, and the telecommunication service is provided by a telecommunication provider external to the enterprise;

determining, by the enterprise computing system, a role of the employee in the enterprise based, at least in part, on information from a human resource department of the enterprise;

determining, by the enterprise computing system, a type of telecommunication service based, at least in part, on the request for the telecommunication service;

classifying, by the enterprise computing system, the request based on at least one of the employee role and the service type, wherein the classification includes determining one or more policies for servicing the request;

implementing, by the enterprise computing system, a workflow for obtaining approvals for the request from one or more employees of the enterprise;

determining, by the enterprise computing system, in accordance with the one or more policies, one or more additional workflows for completing the request including identifying at least one of an enterprise resource or a third-party resource for executing at least a portion of the one or more additional workflows;

determining, by the enterprise computing system, transactions associated with the one or more additional workflows; and     upon receipt of approval,         dispatching, by the enterprise computing system, the transactions for execution including transmitting a service request to the external telecommunication provider and an internal request to one or more departments in the enterprise; and         monitoring, by the enterprise computing system, completion of transactions by the external telecommunication provider and one or more internal departments including notifying the employee assigned to the equipment item that access to the telecommunication services using the equipment item has been established for future access.

2. The method of claim 1 wherein receiving the request includes receiving the request through at least one of a telephone call, a webform, an electronic message, or a form.

3. The method of claim 1 wherein classifying the request includes determining a type of request.

4. The method of claim 3 wherein classifying the request includes determining a policy associated with the type of request.

5. The method of claim 1, wherein determining the employee role includes determining a profile associated with the employee assigned to the equipment item.

6. The method of claim 1, wherein determining the employee role further includes retrieving information from a human resources database of the enterprise to classify the employee.

7. The method of claim 1 wherein implementing a workflow for obtaining approvals for the request includes determining approval logic for the request.

8. The method of claim 7 wherein determining approval logic includes determining particular approvals or partial approvals required based on information associated with employee assigned to the equipment item.

9. The method of claim 8 further comprising retrieving from a human resources database the information associated with the employee.

10. The method of claim 1 wherein determining transactions associated with the additional workflows includes determining physical transactions that need to be completed.

11. The method of claim 1 wherein dispatching the transactions for execution includes providing a queue of transactions that are to be executed by an automation system in the enterprise.

12. The method of claim 1 wherein dispatching the transactions includes downloading transactions from a queue to an automation system for execution.

13. The method of claim 1 wherein monitoring completion of all transactions includes tracking performance of service providers executing transactions.

14. The method of claim 13 wherein monitoring includes rating service providers based on the performance tracking, the ratings being used to select particular service providers for execution of given transactions.

* * * * *